UNITED STATES PATENT OFFICE 2,393,610

POLYDIHYDRONORDICYCLOPENTADIENYL ETHERS

Herman A. Bruson, Philadelphia, Pa., assignor to The Resinous Products & Chemical Company, Philadelphia, Pa., a corporation of Delaware No Drawing. Application March 25, 1944, Serial No. 528,167

14 Claims. (Cl. 260—611)

This invention relates to poly-dihydronordicyclopentadienyl ethers of aliphatic polyhydric alcohols and is a continuation-in-part of my copending application Serial No. 476,640, filed February 20, 1943.

These new ethers are obtained by reacting an aliphatic polyhydric alcohol with at least two molecular equivalents of dicyclopentadiene in the presence of an acidic condensing agent as catalyst. Addition of each of two or more hydroxyl groups of the polyhydric alcohol to one of the double bonds of a dicyclopentadiene molecule occurs with a simultaneous molecular rearrangement of the latter to a hitherto unknown type of tricyclic ring system which, for the sake of brevity, has been termed the "nordicyclopentadiene" ring system. The product obtained is a polyether of hydroxydihydronordicyclopentadiene. In the simplest case, using ethylene glycol, for example, the product is formed in accordance with the following equation, (A) representing the more probable configuration of the two possible isomers (A) and (B):

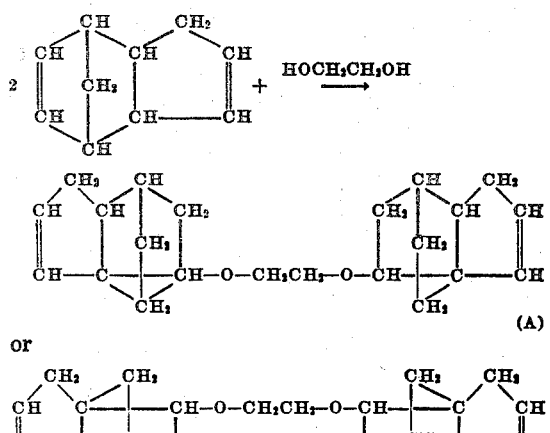

or

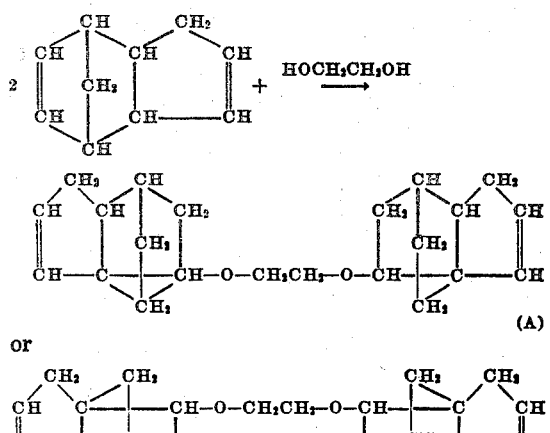

As shown by the above formulae the dihydronordicyclopentadiene group, $C_{10}H_{13}$—, or system is defined by the following structure

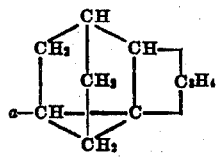

wherein $C_3H_4$ is a propenylene group which in conjunction with the adjoining carbon atoms forms a cyclopenteno ring, as a terminal cycle. At the point marked $a$ the system is attached to a functional group. In this case an alcohol residue having at least one ether substituent is attached through oxygen at $a$ to the indicated secondary carbon atom flanked by a methylene group and a tertiary carbon atom in an endoethylene cyclopentano group carrying the propenylene group which forms the cyclopenteno ring therewith.

In place of the ethylene glycol above, one may use any other aliphatic polyhydric alcohol having at least two free hydroxyl groups per molecule, for example propylene glycol, trimethylene glycol, butylene glycol, hexamethylene glycol, decamethylene glycol, glycerol, glycerol monoethers, glycerol monochlorhydrin, diethylene glycol, dipropylene glycol, triethylene glycol, and other polyalkylene glycols, including hexaethylene glycol, nonaethylene glycol, and higher glycols, pentaerythrite, polyglycerol, polyvinyl alcohol, mannitol, sorbitol, glucose, polysaccharides, and the like.

Among the acidic condensing agents or catalysts which serve to promote the addition-rearrangement reaction are boron trifluoride and its coordination complexes with oxygenated compounds, sulfuric acid, its acid esters such as ethyl acid sulfate, aromatic sulfonic acids such as toluene sulfonic acid, aliphatic sulfonic acids such as butyl sulfonic acid, acidic salts such as zinc chloride, stannic chloride, titanium tetrachloride, antimonic chloride, aluminum chloride, ferric chloride, acidic siliceous clays such as those sold under the trade names of "Tonsil" or "Atapulgas," etc.

As examples of the coordination complexes of boron trifluoride, there may be cited those with ethers, typified by $BF_3.C_2H_5OC_2H_5$ and $BF_3.C_4H_9OC_4H_9$; with carboxylic acids, typified by $BF_3.2CH_3COOH$; with carboxylic esters, typified by $BF_3.2CH_3COOC_2H_5$; with ketones, typified by $BF_3.CH_3COCH_3$; with alcohols, typified by $BF_3.2C_4H_9OH$, and with water, which may be represented by $BF_3.(H_2O)_x$, $x$ being usually one or two.

The preferred catalysts are sulfuric acid and boron trifluoride or its coordination complexes. It is surprising to note that, though even in traces these catalysts promote polymerization of monomeric cyclopentadiene to resins in the absence of an alcohol and also polymerize unsaturated ethers in general, they do neither to any appreciable degree in the case of a mixture of dicyclopentadiene and the polyhydric alcohols as described herein, but on the contrary promote the formation of highly reactive and useful unsaturated ethers by an addition-rearrangement reaction.

The quantity of active catalyst employed may be varied over a wide range. Good results have been obtained with as little as two per cent of catalyst on the weight of the dicyclopentadiene up to and exceeding a molecular equivalent of the catalyst per mol of dicyclopentadiene used. The catalysts need not be used under anhydrous conditions. In fact, the presence of water in small amounts often increases the rate of the reaction.

The addition-rearrangement reaction may be initiated by mixing the components and catalyst at temperatures even as low as 0° C. in some cases, or at room temperature, or at elevated temperatures. While it is generally desirable to control the temperature at the start, the reaction may be accelerated or carried to completion more rapidly by continuing the reaction for a long time or by raising the temperature. Temperatures as high as 100° C. to 150° C. may thus be used, the upper temperature being limited by the cracking tendency of the dicyclopentadiene to revert to monomeric cyclopentadiene. The reaction range of about 50° C. to 145° C. is generally the most useful and is to be preferred. The reaction may be controlled by the rate of mixing the reactants and by the use of a solvent or diluent, such as a hydrocarbon solvent, including petroleum ethers or petroleum naphthas, or chlorinated hydrocarbons such as carbon tetrachloride, ethylene dichloride, tetrachlorethane, and the like.

After the reaction has been carried to the desired point, the acidic condensing agent is removed as by washing with water or neutralization with an alkali, or both. The reaction product may then be distilled in many cases or otherwise purified, as by treatment with decolorizing clay or carbon, stripping, extraction, etc.

The following examples illustrate this invention, it being understood that the proportions, temperatures, and time can be varied over a wide range without departing from the spirit of the invention.

*Example 1*

A solution of 2.4 grams of boron trifluoride in 46.5 grams of ethylene glycol was stirred at 120° C. while 280 grams of technical 95% dicyclopentadiene was added dropwise during the course of 75 minutes, the reaction temperature being maintained at 120°-130° C. The mixture was stirred at 120°-130° C. for seven hours thereafter, then it was neutralized by adding 10 grams of powdered sodium carbonate and five grams of water. and was stirred for fifteen minutes. The black liquid was filtered to remove salts and the filtrate was distilled in vacuo. The crude ethylene di-(dihydronordicyclopentadienyl) ether distilled over between 190° and 220° C. at 2 mm. as a pale yellow oil. The yield was 200-210 grams, or about 80-85% of theory. Upon redistillation, the pure product boiled at 209°-210° C./2 mm. and possessed the following constants: $n_D^{25}$ 1.5263; $d_4^{25}$ 1.077; iodine number, 160 (theory, 156). It is insoluble or only slightly soluble in methanol or ethanol, but is miscible with butanol, cellosolve, acetone, or petroleum naphtha. It possesses the property of drying when exposed to the air in thin layers and goes over to a tough, transparent, varnish-like film. It also polymerizes when heated at 100° C. with 2% to 5% by weight of benzoyl peroxide to form a very viscous pale yellow oil which is useful as a substitute for linseed oil.

*Example 2*

To a stirred mixture of 114 grams of propylene glycol and 560 grams of 95% technical dicyclopentadiene at 60° C., there was added dropwise fourteen grams of boron trifluoride-dibutyl ether, $BF_3.C_4H_9$—O—$C_4H_9$, and the mixture was gradually heated during the course of one hour to 120° C. and was maintained at 125°-130° C. for six and one-half hours while it was stirred continuously. The product was then washed with hot dilute sodium hydroxide solution followed by a hot water wash, and the oil layer was separated and distilled in vacuo. The crude propylene di-(dihydronordicyclopentadienyl) ether having the probable formula:

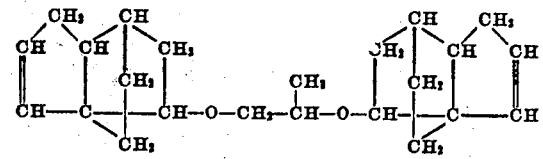

distilled over between 200° and 220° C./2 mm. in a yield of 313 grams.

Upon redistillation in vacuo at 1.5 mm., the pure compound came over as a pale yellow oil at 200°-205° C. When blown with air at 85°-95° C., it forms a very viscous oil which possesses drying properties and is useful as a synthetic drying oil.

*Example 3*

To a stirred mixture of 212 grams of diethylene glycol and fourteen grams of dihydroxy fluoboric acid ($BF_3.2H_2O$) heated to 115° C., there was added dropwise 660 grams of technical 95% dicyclopentadiene during the course of seventy minutes while the reaction temperature was maintained at 115°-120° C. The mixture was then stirred for six and one-half hours longer at 125°-130° C. It was cooled, stirred with a mixture of thirty grams of powdered sodium carbonate and ten grams of water for a half hour to destroy the catalyst, then filtered by suction and the filtrate distilled in vacuo. The di-(dihydronordicyclopentadienyl) ether of diethylene glycol having the probable formula:

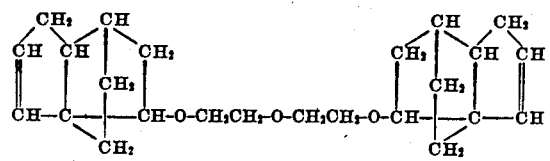

distilled over between 210° and 235° C./1-1.5 mm. in a yield of 350 grams.

Upon redistillation, the compound came over at 232°-236° C./2 mm. as a pale yellow oil having the following constants: $n_D^{25}$ 1.5190; $d_4^{25}$ 1.081.

*Example 4*

To a stirred suspension of 55 grams of powdered mannitol and 118 grams of pure dicyclopentadiene heated to 60° C., there was gradually added fifteen grams of boron trifluoride-diethyl ether ($BF_3.C_2H_5$—O—$C_2H_5$) complex. The exothermal reaction was controlled by cooling so that the temperature did not exceed 75° C. The mixture was stirred for one hour longer at 60° C. The solidified mass was then washed several times with hot water, and the dark resinous product dissolved in warm toluene. The toluene solution was washed with water, then with soda solution, and finally again with water, and was evaporated to dryness in vacuo at 100° C.

The residue was a brittle amber-colored resinous solid, weighing 130 grams and consisting essentially of a dihydronordicyclopentadienyl triether of mannitol. It was soluble in petroleum naphtha, and films cast therefrom absorbed oxygen from the air.

*Example 5*

(a) To a stirred mixture of 92 grams of glycerol and 15 grams of $BF_3 \cdot O(C_2H_5)_2$ heated to 90° C., there was added dropwise 420 grams of 95% dicyclopentadiene during the course of eighty minutes. The exothermal reaction was controlled at 115°–125° C. by cooling. The mixture was then heated at 125° C. for six hours longer. The very viscous mass was washed with hot dilute sodium hydroxide solution, taken up in ethylene dichloride, washed again, and the solvent distilled off in vacuo. The residual black mass was vacuum-distilled in a current of steam. The oil which came over was then redistilled in vacuo and the fraction boiling at 295°–300° C./2 mm. was collected. Its analysis corresponds to glyceryl-tri-(dihydronordicyclopentadienyl) ether,

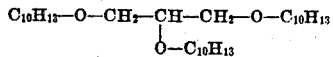

$$C_{10}H_{13}-O-CH_2-CH-CH_2-O-C_{10}H_{13}$$
$$\qquad\qquad\qquad | $$
$$\qquad\qquad\qquad O-C_{10}H_{13}$$

It is a viscous balsam which dries in the air by oxygen absorption to a hard, colorless, varnish-like film.

(b) By using 290 grams of glycerol instead of 420 grams, the main product is glyceryl-di-(dihydronordicyclopentadienyl) ether,

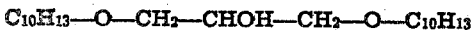

$$C_{10}H_{13}-O-CH_2-CHOH-CH_2-O-C_{10}H_{13}$$

a colorless thick oil, boiling at 235°–240° C./2 mm.

*Example 6*

(a) Three hundred fifty grams of dicyclopentadiene was added dropwise at 110°–115° C. to a stirred mixture of 76 grams of trimethylene glycol and 10 grams of boron trifluoride-dibutyl ether complex during the course of one hour. The mixture was then heated at 120°–125° C. for five and one-half hours, washed with hot caustic soda solution, dried, and distilled in vacuo. After unchanged dicyclopentadiene had come off, a fraction (130 grams) boiling at 130°–140° C./2 mm. was obtained which corresponded to the monoether, $C_{10}H_{13}-O-CH_2CH_2CH_2OH$. The diether,

$$C_{10}H_{13}-O-CH_2CH_2CH_2-O-C_{10}H_{13}$$

wherein $C_{10}H_{13}$ represents the dihydronordicyclopentadienyl radical, distilled over at 210°–220° C./2 mm. as a pale yellow oil.

(b) A mixture of 76 grams of trimethylene glycol and 10 grams of boron trifluoride dihydrate, $BF_3 \cdot 2H_2O$, was added dropwise to 350 grams of dicyclopentadiene at 60° C. while the latter was stirred. The temperature was gradually raised to 115° C. and held thereat for seven hours. The product was washed with hot sodium hydroxide solution, dried, and distilled in vacuo. The crude trimethylene glycol di-(dihydronordicyclopentadienyl) ether distilled over at 225°–230° C./2 mm. as a pale yellow oil in a yield of 293 grams. Upon redistillation, it boiled at 220°–225° C./2.5 mm.

*Example 7*

Dicyclopentadiene (350 grams) was gradually added during the course of one and one-quarter hours to a stirred mixture of 110 grams of glycerol monochlorhydrin and 15 grams of boron trifluoride-diethyl ether, $BF_3 \cdot O(C_2H_5)_2$, while the temperature gradually rose from 65° to 105° C. Heating and stirring at 95° C. was then continued for six and three-quarter hours, and the product was cooled, washed with dilute sodium hydroxide solution, dried, and distilled in vacuo. The di-(dihydronordicyclopentadienyl) ether of glycerol chlorhydrin,

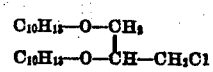

$$C_{10}H_{13}-O-CH_2$$
$$C_{10}H_{13}-O-CH-CH_2Cl$$

distilled over at 235°–250° C./3–4 mm. as a viscous reddish oil. The yield was 128 grams. Upon redistillation, the pure product distilled at 235°–240° C./3.5 mm. as an almost colorless viscous oil.

*Example 8*

Dicyclopentadiene (204 grams) was reacted with a mixture of 10 grams of $BF_3 \cdot O(C_2H_5)_2$ and 155 grams of glyceryl-α-methyl ether at 120°–125° C. by the procedure described in Example 7.

The di-(dihydronordicyclopentadienyl) ether of glyceryl-α-methyl ether obtained was a colorless oil boiling at 215°–220° C./2.5 mm. The yield was 108 grams.

*Example 9*

Dicyclopentadiene (280 grams) was reacted with a mixture of 10 grams of $BF_3 \cdot O(C_2H_5)_2$ and 300 grams of triethylene glycol at 110°–120° C. for seven hours as described in Example 7. The mixture was washed, dried, and distilled in vacuo. There was obtained 105 grams of the di-(dihydronordicyclopentadienyl) ether of triethylene glycol,

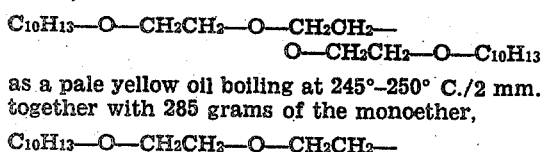

$$C_{10}H_{13}-O-CH_2CH_2-O-CH_2CH_2-$$
$$O-CH_2CH_2-O-C_{10}H_{13}$$

as a pale yellow oil boiling at 245°–250° C./2 mm. together with 285 grams of the monoether,

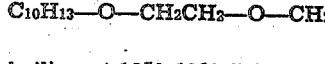

$$C_{10}H_{13}-O-CH_2CH_2-O-CH_2CH_2-$$
$$O-CH_2CH_2OH$$

boiling at 185°–190° C./2 mm.

*Example 10*

A mixture of 10 grams of dihydroxy-fluoboric acid, $BF_3 \cdot 2H_2O$, and 291 grams of tetraethylene glycol was added dropwise during the course of one and one-half hours to 420 grams of dicyclopentadiene while the mixture was stirred and the reaction temperature was maintained at 115° C. After all had been added, the mixture was stirred for three hours longer at 120° C., then it was washed with hot water and with sodium hydroxide solution, dried, and distilled in vacuo.

The dihydronordicyclopentadienyl monoether of tetraethylene glycol,

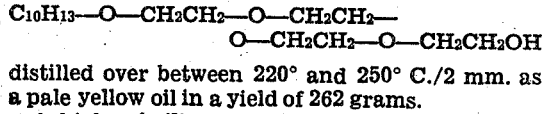

$$C_{10}H_{13}-O-CH_2CH_2-O-CH_2CH_2-$$
$$O-CH_2CH_2-O-CH_2CH_2OH$$

distilled over between 220° and 250° C./2 mm. as a pale yellow oil in a yield of 262 grams.

A higher boiling fraction (boiling point, 280°–290° C./2 mm.) was also obtained, amounting to 94 grams, corresponding to the diether,

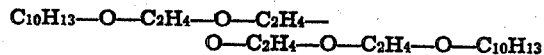

$$C_{10}H_{13}-O-C_2H_4-O-C_2H_4-$$
$$O-C_2H_4-O-C_2H_4-O-C_{10}H_{13}$$

It is a pale yellow oil.

The ethers of this invention polymerize when heated with 5% of benzoyl peroxide at 100° C. to viscous oils. They also polymerize to viscous liquids when blown with air at 80°–100° C. The resulting polymers, as well as the unpolymerized ethers themselves, when applied as coatings, rapidly absorb oxygen from the air to form varnish-like films, particularly in the presence of siccatives. They can, therefore, be used alone or in conjunction with natural fatty glycerides such as, for example, linseed oil, tung oil, soya bean oil, or dehydrated castor oil, or with alkyd resins to yield varnishes.

I claim:

1. An acid-catalyzed, addition-rearrangement product of an aliphatic polyhydric alcohol and at least two molecular equivalents of dicyclopentadiene, said product being a poly-dihydronordicyclopentadienyl ether of the said alcohol, in which the alcohol residue is attached through oxygen to at least two dihydronordicyclopentadienyl groups at a secondary carbon atom thereof which is flanked by a methylene group and by a tertiary carbon atom in an endoethylene cyclopentano group carrying a propenylene group which forms a cyclopenteno ring therewith.

2. An acid-catalyzed, addition-rearrangement product of one molecule of an aliphatic polyhydric alcohol and two molecules of dicyclopentadiene, said product being a di-dihydronordicyclopentadienyl ether of the said alcohol in which the alcohol residue is attached through oxygen to two dihydronordicyclopentadienyl groups at a secondary carbon atom thereof which is flanked by a methylene group and by a tertiary carbon atom in an endoethylene cyclopentano group carrying a propenylene group which forms a cyclopenteno ring therewith.

3. An acid-catalyzed, addition-rearrangement product of one molecule of an aliphatic dihydric alcohol and two molecules of dicyclopentadiene, said product being a di-dihydronordicyclopentadienyl ether of said alcohol, in which the alcohol residue is attached through oxygen to two dihydronordicyclopentadienyl groups at a secondary carbon atom thereof which is flanked by a methylene group and by a tertiary carbon atom in an endoethylene cyclopentano group carrying a propenylene group which forms a cyclopenteno ring therewith.

4. An acid-catalyzed, addition-rearrangement product of one molecule of an alkylene glycol and two molecules of dicyclopentadiene, said product being a di-dihydronordicyclopentadienyl ether of said glycol, the non-hydroxylated residue of which is attached through oxygen to two dihydronordicyclopentadienyl groups at a secondary carbon atom thereof which is flanked by a methylene group and by a tertiary carbon atom in an endoethylene cyclopentano group carrying a propenylene group which forms a cyclopenteno ring therewith.

5. An acid-catalyzed addition-rearrangement product of one molecule of ethylene glycol and two molecules of dicyclopentadiene, said product being a di-dihydronordicyclopentadienyl ether of said glycol, in which the ethylene group is attached through oxygen to two dihydronordicyclopentadienyl groups at a secondary carbon atom thereof which is flanked by a methylene group and by a tertiary carbon atom in an endoethylene cyclopentano group carrying a propenylene group which forms a cyclopenteno ring therewith.

6. An acid-catalyzed, addition-rearrangement product of one molecule of diethylene glycol and two molecules of dicyclopentadiene, said product being a di-dihydronordicyclopentadienyl ether of said glycol, the non-hydroxylated residue of which is attached through oxygen to two dihydronordicyclopentadienyl groups at a secondary carbon atom thereof which is flanked by a methylene group and by a tertiary carbon atom in an endoethylene cyclopentano group carrying a propenylene group which forms a cyclopenteno ring therewith.

7. An acid-catalyzed, addition-rearrangement product of one molecule of propylene glycol and two molecules of dicyclopentadiene, said product being a di-dihydronordicyclopentadienyl ether of said glycol, in which the propylene group is attached through oxygen to two dihydronordicyclopentadienyl groups at a secondary carbon atom thereof which is flanked by a methylene group and by a tertiary carbon atom in an endoethylene cyclopentano group carrying a propenylene group which forms a cyclopenteno ring therewith.

8. A method for preparing a poly-dihydronordicyclopentadienyl ether of an aliphatic polyhydric alcohol which comprises reacting an aliphatic polyhydric alcohol with at least two molecular equivalents of dicyclopentadiene in the presence of an acidic condensing agent.

9. A method for preparing a poly-dihydronordicyclopentadienyl ether of an aliphatic polyhydric alcohol which comprises reacting an aliphatic polyhydric alcohol with at least two molecular equivalents of dicyclopentadiene in the presence of a boron trifluoride condensing agent.

10. A method for preparing a di-dihydronordicyclopentadienyl ether of an aliphatic dihydric alcohol which comprises reacting an aliphatic dihydric alcohol with at least two molecular equivalents of dicyclopentadiene in the presence of boron trifluoride.

11. A method for preparing a dihydronordicyclopentadienyl di-ether of an alkylene glycol which comprises reacting an alkylene glycol with at least two molecular equivalents of dicyclopentadiene in the presence of a boron trifluoride catalyst.

12. A method for preparing a dihydronordicyclopentadienyl di-ether of ethylene glycol which comprises reacting ethylene glycol with at least two molecular equivalents of dicyclopentadiene in the presence of a boron trifluoride catalyst.

13. A method for preparing a dihydronordicyclopentadienyl di-ether of diethylene glycol which comprises reacting diethylene glycol with at least two molecular equivalents of dicyclopentadiene in the presence of a boron trifluoride catalyst.

14. A method for preparing a dihydronordicyclopentadienyl di-ether of propylene glycol which comprises reacting propylene glycol with at least two molecular equivalents of dicyclopentadiene in the presence of a boron trifluoride catalyst.

HERMAN A. BRUSON.